United States Patent [19]

Weitz

[11] 4,148,266
[45] Apr. 10, 1979

[54] SEED SOWING MECHANISM

[75] Inventor: Otto Weitz, Butzbach, Fed. Rep. of Germany

[73] Assignee: A. J. Tröster GmbH & Co. KG, Butzbach, Fed. Rep. of Germany

[21] Appl. No.: 770,693

[22] Filed: Feb. 22, 1977

[30] Foreign Application Priority Data

Apr. 1, 1976 [DE] Fed. Rep. of Germany ....... 2613948

[51] Int. Cl.² .............................................. A01C 5/00
[52] U.S. Cl. ....................................... 111/52; 111/85; 172/400; 172/411; 172/417; 172/657
[58] Field of Search ................ 172/400, 401, 402, 414, 172/421, 422, 406, 407, 411, 417, 180, 633, 657; 111/52, 53, 54, 56, 57, 58, 59, 60, 61, 62, 63, 64, 65, 66, 67, 68, 69, 71, 84, 85, 86, 70, 80

[56] References Cited

U.S. PATENT DOCUMENTS

| 851,959 | 4/1907 | Peterson | 172/400 |
|---|---|---|---|
| 1,218,681 | 3/1917 | Miller | 172/400 X |
| 1,338,200 | 4/1920 | VanPatten | 172/400 X |
| 3,060,873 | 10/1962 | Powers | 111/80 X |
| 3,880,100 | 4/1975 | Gillies et al. | 111/85 X |
| 4,027,606 | 6/1977 | Knapp | 111/85 X |

FOREIGN PATENT DOCUMENTS

| 666677 | 1/1893 | Fed. Rep. of Germany | 172/400 |
|---|---|---|---|
| 970400 | 1/1951 | France | 172/400 |
| 812200 | 8/1959 | United Kingdom | 111/85 |
| 1175899 | 1/1970 | United Kingdom | 111/85 |
| 1455785 | 11/1976 | United Kingdom | 111/85 |
| 233321 | 12/1968 | U.S.S.R. | 111/85 |
| 281051 | 9/1970 | U.S.S.R. | 111/85 |

Primary Examiner—Edgar S. Burr
Assistant Examiner—James R. Feyrer
Attorney, Agent, or Firm—Cooper, Dunham, Clarke, Griffin & Moran

[57] ABSTRACT

A mechanism for sowing seeds having a seed supply device which is carried by a sower frame. Front and rear wheels for supporting the frame are carried by arms pivotally coupled to the frame, which arms include lever arm appendages which are coupled together by a coupling rod of variable length pivotally coupled at opposite ends thereof to the lever arm appendages so as to provide for correlated movements of the front and rear arms.

11 Claims, 1 Drawing Figure

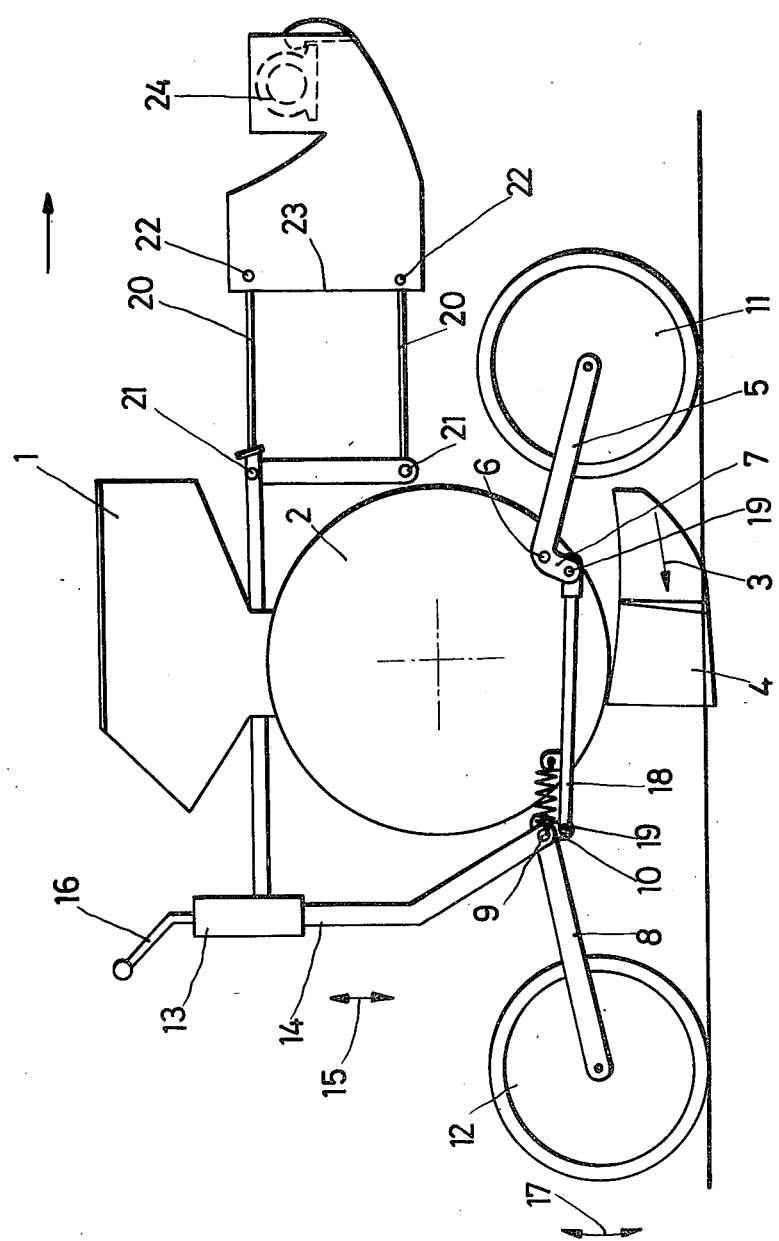

SEED SOWING MECHANISM

BACKGROUND AND BRIEF DESCRIPTION OF THE INVENTION

The invention relates to mechanisms for sowing seeds, particularly to a single-grain sower, having a container of grains connected to a device which places them into a furrow made by a plowshare.

It is known from British Pat. No. 1,413,849 published Nov. 12, 1975 to provide such a mechanism connected by a coupling rod to a tractor, with wheels before and behind the plowshare connected pivotably by lever arms to the frame that carries the sower. It is important for the depth to which the plowshare enters the ground to be adjustable to suit what is being sowed. For this purpose, that patent discloses the pivotal adjustment of the wheel-carrying lever arms through use of a handwheel with a screw-threaded spindle upon which runs a nut articulated to two links, whose outer ends are coupled to the lever arms. By operating the handwheel, the nut is moved up or down along the screw-threaded spindle, subjecting the lever arms to opposed pivoting movements which changes the location of the axles of the road-wheels, thereby adjusting the penetration of the plowshare into the ground to the desired depth.

This known sower can be coupled to a tractor by a simple linking rod. With some applications, however, it is advantageous to utilize a parallelogram-type coupling of the sower to the tractor, particularly in irregular terrain. However, utilizing such a coupling with a seed sowing mechanism of adjustable depth as disclosed in the British patent produces a mechanism which is unable to follow irregularities in the terrain. It is also important that the front road-wheel presses harder onto the ground than the rear road-wheel so that the front wheel compacts the earth where the seeds are to be sown, while the rear wheel smoothes the furrow. This differing load distribution is also not possible in an arrangement as in the British patent.

The present invention is directed to the coupling of a sower to a tractor by a parallelogram-type coupling while providing for the adjustable depth of the plowshare, and proper following of all irregularities of terrain and the greater loading of front road-wheels than the rear ones.

The invention is characterized in that, particularly with a parallelogram-type coupling, the two wheel-carrying lever arms are connected so that they are able to freely make similar pivoting movements during operation of the sower (i.e., as one wheel moves upwardly, the other wheel moves downwardly) and are not connected rigidly as in the British patent. Both road wheels thus adhere to the ground even where it is irregular, and even though the parallelogram-type coupling provides a firm coupling between the tractor and sower frame. Furthermore, through the use of lever arm appendages of different lengths, e.g., with the front length about double that of the rear, the desired distribution of load between the front and rear wheels (greater in the front) is achieved.

For adjusting the sower to sow to different depths, location of one or both lever arms can be adjusted in height. This adjustment is needed to adapt the sower to different kinds of seeds. The adjustment is preferably done through the location of the rear lever arm being changed by the operation of a crank. Furthermore, the length of the coupling between lever arms may also be variable, so as to additionally adjust the depth of sowing. Still further, by selecting road-wheels of differing sizes, seed sowing depth may also be adjusted.

The invention is explained in more detail in the following detailed description.

BRIEF DESCRIPTION OF THE DRAWING

The FIGURE shows schematically, in side view, the essential components of a presently preferred seed sowing mechanism embodying the invention.

DETAILED DESCRIPTION

A seed container 1 is connected to a single seed providing device 2 which in the example given is in the form of a pneumatically driven disk (not shown) revolving in a housing. Such a device is of itself known. The individual seeds go in the direction of the arrow 3 into the ground, previously provided by a plowshare 4 with a suitable furrow. There is also disposed in the sower frame a front lever arm 5, pivotable on a pivot pin 6. The lever arm 5 has an integral appendage 7 set at about a right angle thereto. Similarly, lever arm 8 at the rear of the frame pivots about a pivot pin 9, and it too has an appendage 10 set at approximately a right angle thereto. As will be noted from the drawing, the lever arm appendages extend generally to the same side of an imaginary line that connects the pivot pins 6 and 9; this feature assures that the lever arms 5 and 8 pivot in the same sense.

At the front end of the front arm 5 is a bearing for front road-wheel 11. Similarly, there is at the rear end of the rear arm 8 a bearing for rear road-wheel 12. The appendage 7 of the front arm is larger than that (10) of the rear arm, a ratio of about 2 to 1 being preferred.

A cylinder 13 is also fastened to the frame, in which a bar 14 can reciprocate in the direction of double arrow 15. This movement is produced by a crank 16 connected to bar 14. When the crank 16 is operated, the bar 14 is pushed either up or down. At the lower end of the bar 14 is disposed the rear arm 8. With a shift of the bar 14, there occurs a repositioning of the location of the arm 8 relatively to the sower. The penetration of the plowshare into the ground is thereby adjusted.

The outer ends of the appendages 7 and 10 are pivotally connected to a rod 18 through articulations 19. The rod 18 is adjustable in length.

At the front end of the apparatus is provided a parallelogram-type coupling to a tractor, and it comprises two parallel bars 20, whose left-hand ends in the Figure are connected by articulations 21 to the frame of the sower. At the other ends of the rods are similar articulations 22, connected by a coupling piece 23 to the underframe 24 of a tractor.

Instead of the rigid connection of the British patent between the lever arms that carry the road-wheels, the present invention utilizes arms 5 and 8 that are able to pivot about the axes 6 and 9 relative to the frame, the pivoting being in the same sense, i.e., both clockwise or both counterclockwise, so that when one wheel moves upwardly the other wheel moves downwardly. The rod 18, pivotally coupled to the lever arms, permits related pivoting action of the lever arms. Because of the selected ratio of the lengths of the lever arm appendages 7 and 10, the front road-wheel 11 is always loaded the most.

The sower shown in the Figure is particularly useful for sowing to small depths, e.g., 2 to 6 cm.

A coil-spring is connecting the rod 18 with pin 9 for drawing the appendage 10 in clockwise direction. This serves for lifting the back wheel 12 to an upper stop in case the apparatus is lifted from touching the ground.

The preferred embodiment is obviously subject to modification. The invention thus should be taken to be defined by the following claims.

What is claimed is:

1. In a mechanism for sowing seeds having seed supply device including a plow carried by a sower frame and front and rear wheels for supporting the frame, said rear wheel being carried by a rear arm pivotally coupled at one end to the axle of said rear wheel and at the other end to said sower frame, and a front arm pivotally coupled at one end to the axle of said front wheel and at the other end to said frame, said front and rear arms including lever arm appendages, the improvement comprising means for moving one of said wheels generally upwardly when the other is moved generally downwardly, and vice versa, comprising a coupling rod connected by pivitol connections at its opposite ends to said lever arm appendages so that generally vertical movement of one of said wheels will result in concomitant movement of said coupling rod and generally vertical movement of the other of said wheels in the opposite direction of the movement of said one of said wheels, said concomitant movement of said coupling rod being determined solely by forces imparted through said pivitol connections.

2. Apparatus according to claim 1, in which said coupling rod includes means for varying its length.

3. Apparatus according to claim 1, in which said lever arm appendages of said front and rear arms are of differing lengths.

4. Apparatus according to claim 3, in which the lever arm appendage of said front arm is longer than the lever arm appendage of said rear arm.

5. Apparatus according to claim 3, in which the lever arm appendage of said front arm is about twice as long as the lever arm appendage of said rear arm.

6. Apparatus according to claim 1, including means for adjusting the pivotable coupling of at least one of said front and rear arms to said frame in height.

7. Apparatus according to claim 6, in which the pivotable coupling of said rear arm to said frame is adjustable in height.

8. Apparatus according to claim 1, in which said sower frame includes a parallelogram-type coupling mechanism for towing the frame behind a vehicle.

9. Apparatus according to claim 1, including a parallelogram-type coupling mechanism for towing the frame behind a vehicle, said coupling rod being variable in length, the lever arm appendage of said front arm being about twice as long as the lever arm appendage of said rear arm, and including means for adjusting the pivotable coupling of said rear arm to said frame in height.

10. Apparatus according to claim 1, wherein said lever arms are pivotally coupled to said frame at spaced points thereon, and said lever arm appendages extend generally to the side of an imaginary line connecting said spaced points.

11. Apparatus according to claim 1, in which said rear arm extends generally rearwardly from said frame to said rear wheel and said front arm extends generally forwardly from said frame to said front wheel, and said coupling rod is connected to said lever arm appendages to provide for pivoting movement of both lever arms in the same sense.

* * * * *